United States Patent [19]

Wells et al.

[11] Patent Number: 4,884,552
[45] Date of Patent: Dec. 5, 1989

[54] GAS OVEN

[76] Inventors: Kelley J. Wells, 6424 Stillhouse La., High Ridge, Mo. 63049; Everett F. Graham, 23135 Commerce Dr., Farmington Hills, Mich. 48024

[21] Appl. No.: 160,675

[22] Filed: Feb. 26, 1988

[51] Int. Cl.⁴ ............................................. A21B 1/00
[52] U.S. Cl. ........................... 126/19 R; 126/21 R; 126/91 A; 99/443 C; 99/447; 99/386
[58] Field of Search ............... 126/21 R, 21 A, 19 R, 126/19 A, 91 R, 91 A, 92 B, 92 R, 92 AC, 39 D, 39 K; 99/386, 443 C, 401, 447, 446, 400; 219/386, 400; 34/203, 205, 207, 208, 214–216; 432/175, 176, 177, 195, 164, 186

[56] References Cited

U.S. PATENT DOCUMENTS

| | | | |
|---|---|---|---|
| 1,652,737 | 12/1927 | Scott et al. | 126/273 |
| 1,839,469 | 1/1932 | Dibble | 126/273 |
| 1,964,372 | 6/1934 | Tygart | 126/273 |
| 2,081,560 | 5/1937 | Rogers | 126/36 |
| 2,762,321 | 9/1956 | Cook | 34/208 |
| 3,399,833 | 9/1968 | Johnson | 237/53 |
| 3,448,678 | 6/1969 | Burstein | 99/443 C |
| 3,499,430 | 3/1970 | Kemp | 126/21 R |
| 3,710,775 | 1/1973 | Tamada et al. | 126/21 R |
| 3,739,766 | 6/1973 | Helgeson | 126/19 R |
| 3,779,228 | 12/1973 | Mizuno et al. | 126/21 R |
| 3,915,149 | 10/1975 | Kemp | 126/273 R |
| 4,004,128 | 1/1977 | Marchesi | 126/91 A |
| 4,044,751 | 8/1977 | Johnson | 126/91 A |
| 4,176,589 | 12/1979 | Stuck | 99/386 |
| 4,233,495 | 11/1980 | Scoville et al. | 219/386 |
| 4,240,397 | 12/1980 | Seidel | 126/21 R |
| 4,245,613 | 1/1981 | Wells et al. | 126/19 R |
| 4,389,562 | 6/1983 | Chalidoir | 34/216 |
| 4,473,004 | 9/1984 | Wells et al. | 126/21 R |
| 4,529,123 | 7/1985 | Johnson | 237/1 R |
| 4,655,126 | 4/1987 | Wells | 99/443 C |
| 4,727,854 | 3/1988 | Johnson | 126/91 A |

Primary Examiner—James C. Yeung
Attorney, Agent, or Firm—Cohn, Powell & Hind

[57] ABSTRACT

An apparatus (1) for baking food products includes an elongated tunnel (3) defining an oven (5). A conveyor (13) conveys food through the tunnel. Gas supplied to the tunnel is combusted by burners (43, 45) and the heat generated by the combustion is imparted to an upper hearth (17) and a lower hearth (19) by heat exchangers. The hearths radiate the heat into the oven to bake food product being conveyed therethrough and upper and lower sets of temperature sensors (93, 95) are provided to control the oven heat.

12 Claims, 5 Drawing Sheets

GAS OVEN

BACKGROUND OF THE DISCLOSURE

This invention relates generally to ovens, and more particularly, to a gas radiant, conveyorized, tunnel oven.

In the food preparation industry, for example, in the pizza business, the conveyor ovens typically used to prepare the product have been primarily electric ovens. With the rising cost of electricity there has been a changeover from electric to gas ovens. These ovens, which are conveyor ovens that allow for the continuous cooking of pizza or other food products, are convective gas ovens. In such ovens, air is superheated and then moved at medium to high velocities over the food. Superheated air moving at high velocities is disadvantageous because it dehydrates the food and has an overall corrosive effect on the resultant food product.

One way to avoid the problem outlined above is to use radiant heat as the cooking medium. However, this has only been possible using electric ovens and, as noted above, the rising cost of electricity has made this type of oven not cost efficient. What is required is an oven that permits cookings with lower cost gas but, at the same time, does the cooking by radiant heat.

The present oven overcomes the deficiencies inherent in former ovens in a manner not disclosed in the known prior art.

SUMMARY OF THE INVENTION

Among the several aspects of the present invention may be noted the provision of a conveyorized tunnel oven; the provision of such an oven utilizing gas as the heating source; the provision of such an oven in which radiant heat rather than convective heat is used to cook the food; the provision of such an oven in which the radiant heat is evenly distributed across the oven to provide uniform cooking of the product; the provision of such an oven in which the temperature in the oven is controlled as is the cycle time for moving a food product through the oven; the provision of an oven in which room temperature air is circulated around the oven to maintain the exterior temperature of the oven at a level which tends to reduce problems resulting from relatively high surface temperatures for people working in proximity of the oven; and, the provision of such an oven which can be arranged in multiple units to increase volume production and which is portable.

This invention includes an elongate tunnel defining an oven having an opening at one end for placing food products into the oven and an opening at the other end for removing baked food products; means for conveying food products from one end of the tunnel to the other; combustion means for combusting gases supplied to the apparatus and upper and lower hearth means to which heat generated by the combustion of gases is imparted the upper hearth means radiating the heat imparted thereto downwardly on to the food product as it passes through the tunnel and the lower hearth means radiating the heat imparted thereto upwardly onto the food product.

It is an aspect of this invention to provide upper and lower longitudinally extending duct means to which heat from the combustion gases is directed said hearth means forming a portion of the duct means with which they are associated. It is another aspect of this invention to provide a heat exchanger means for distribution of the heat of combustion to the upper and lower heating duct means, and an aspect of this invention to provide that the heating duct is formed from a block of heat absorbent material.

It is yet another aspect of this invention to provide that the heat exchanger is oriented transversely to the respective upper and lower duct means and has a plurality of outlets for conducting heat from its respective burner into the duct means various points along the length of the heat exchanger block.

It is another aspect of this invention to provide that the outlets from each heat exchanger into the respective heating duct means increase in area from the outlet nearest the inlet to the outlet furthest from the inlet.

It is another aspect of this invention to provide that the conveying means includes means for sensing and controlling the conveyor motor speed and thereby the transit time of food through the tunnel.

It is yet another aspect of this invention to provide cooling means for directing ambient air with the outside of the tunnel to maintain the temperature on the outside of the apparatus at a desired level.

It is another aspect of this invention to provide the longitudinal duct means with inside and outside insulation.

Still another aspect of this invention is to provide temperature sensing means including a plurality of first temperature sensors positioned inside the tunnel adjacent to the upper hearth means and a plurality of second temperature sensors positioned inside the tunnel adjacent the lower hearth means said temperature sensors sensing primarily emitted heat.

It is an aspect of this invention to provide that the lower hearth means includes a hearth plate and the temperature sensors are attached directly to said hearth plate to sense emitted heat and to provide that the upper hearth means includes an upper hearth plate and at least one upper temperature sensor is attached directly to said hearth plate and at least one temperature sensor is spaced from said hearth plate, said sensors cooperating to sense emitted and radiant heat.

It is another aspect of the invention to provide that the combustion means includes power burners.

It is an important aspect of this invention to provide a gas oven apparatus which is relatively inexpensive to manufacture, easy to maintain and relatively simple to operate.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Referring to the drawings, a cooking apparatus for baking food products is indicated generally as numeral 1 and includes an elongate tunnel 3 defining an oven 5. The tunnel has an opening 7 at the ingress end for placing food product into the oven, and an opening 9 at its egress end by which product is removed from the oven. A conveying means 11 is provided including a link conveyor 13 for moving food product from end 7 of the tunnel to end 9 thereof.

Figures 8A, 12, 13, 14:
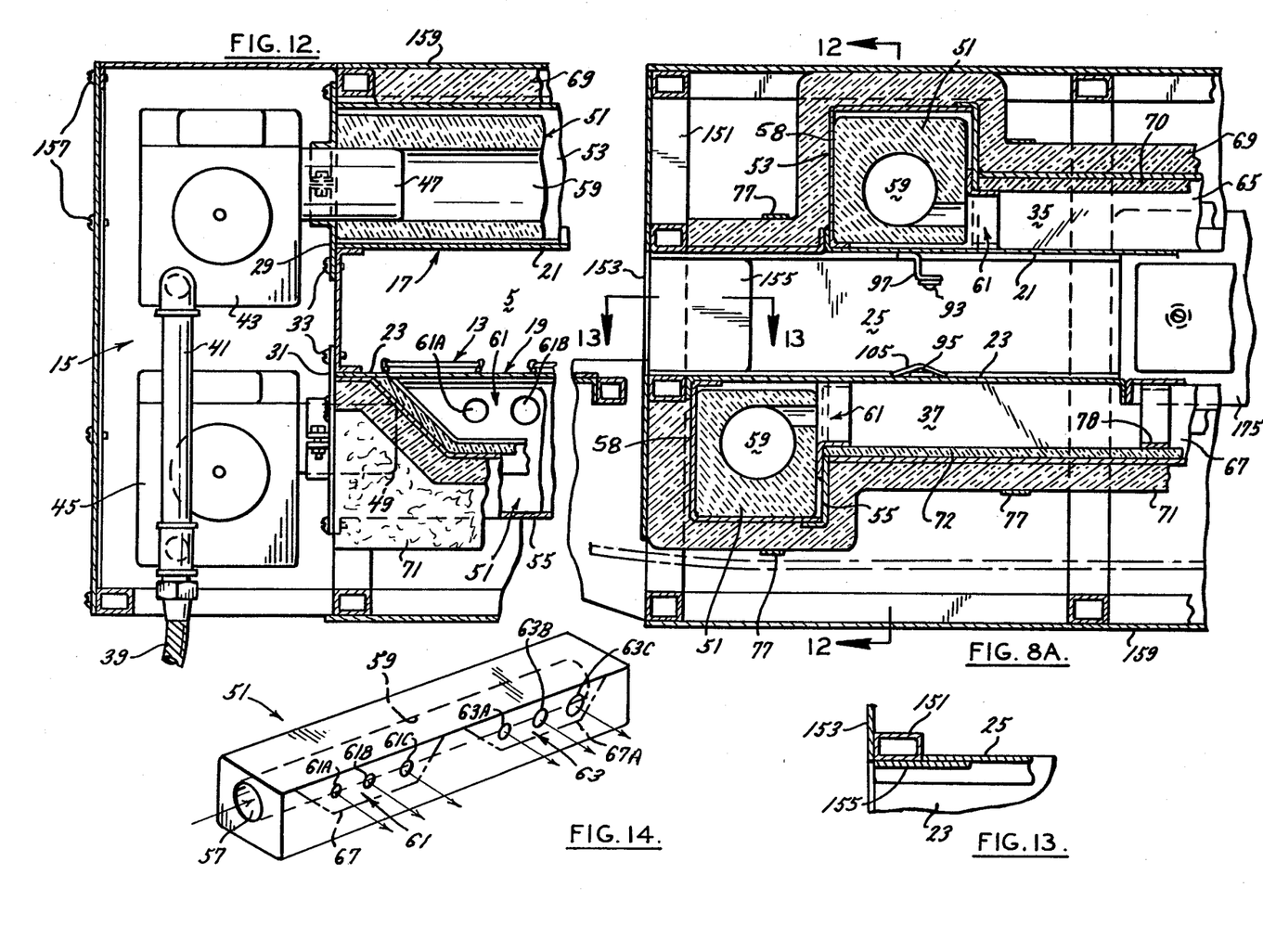
FIGS. 8A and 8B are elevational views taken along line 8—8 in FIG. 1 and illustrating the tunnel of the oven and the radiant heating portion thereof.
FIG. 12 is a sectional view taken along line 12—12 in FIG. 8A and illustrating the burners for combusting gas.
FIG. 13 is a sectional view taken along line 13—13 in FIG. 8A and illustrating a detail of the entry end structure of the oven.
FIG. 14 is a perspective view of a heat exchanger used in the oven.

The cooking apparatus 1 is supplied with gas and the apparatus has a means 15 for combusting gas (see FIG. 12). The heat generated by the combustion of this gas is imparted to an upper hearth means 17 and a lower hearth means 19. The upper hearth means 17 radiates the heat imparted to it downwardly into oven 5 while lower hearth means 19 radiates the heat imparted to it upwardly into the oven. The heat radiated into the oven bakes the food product uniformly as it traverses the tunnel.

Figures 8B, 9, 10, 11:
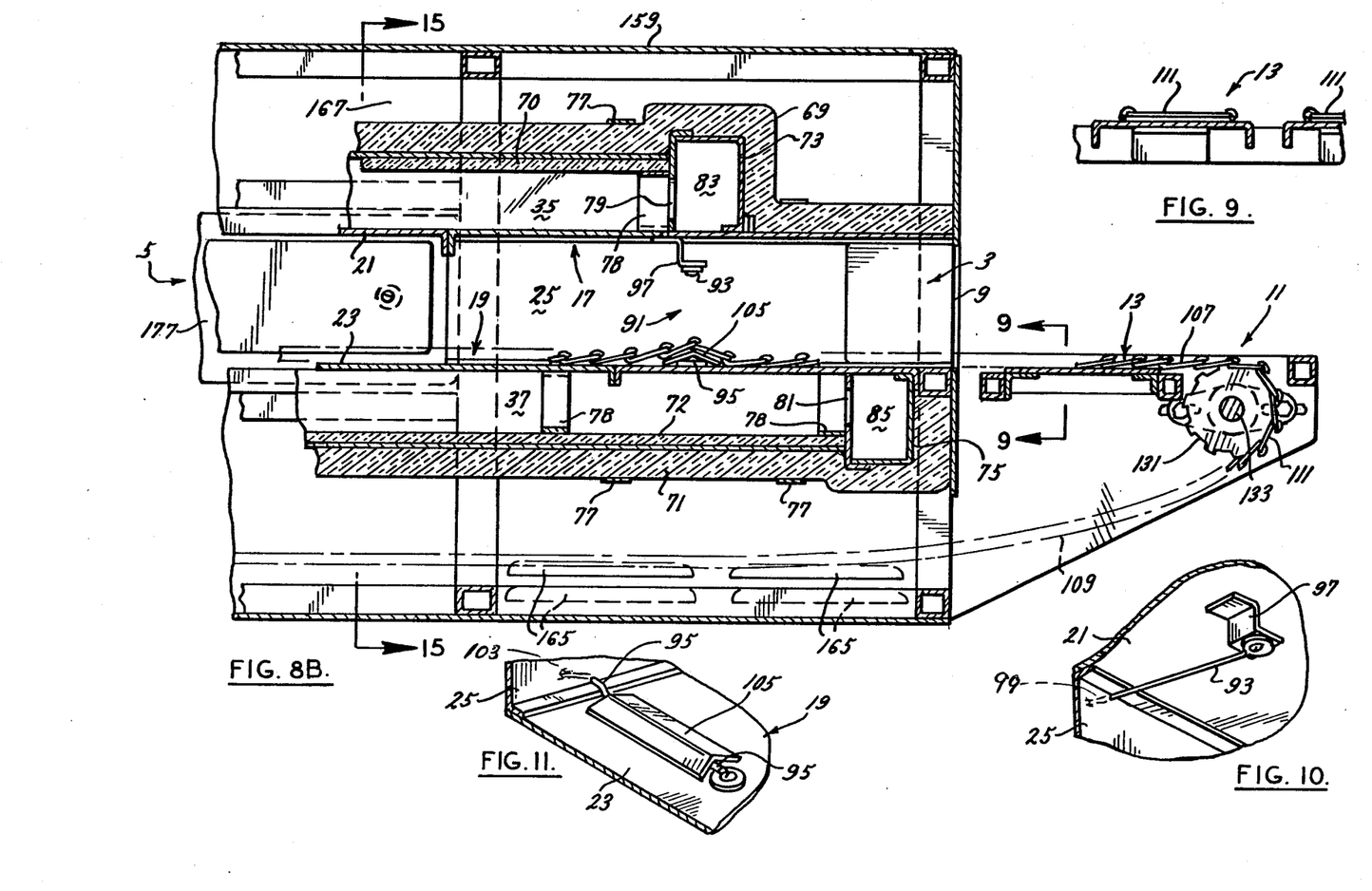
FIG. 9 is a sectional view taken along line 9—9 in FIG. 8B and illustrating a portion of the conveyor used for moving food through the oven.
FIG. 10 is a perspective view of a temperature sensor for sensing heat inside the oven.
FIG. 11 is a perspective view of a second temperature sensor for sensing heat inside the oven and a ramp protecting the sensor.

In more detail, and referring to FIGS. 8A and 8B, tunnel 3 is formed of an upper hearth plate 21, a lower hearth plate 23, and side walls 25 and 27. As shown in FIGS. 8A and 8B, for example, the hearth plates and the side walls may be in sections joined together in an appropriate way as, for example, by welding. Also, the side walls are attached to frame members such as the frame members 29 and 31 shown in FIG. 12 in an appropriate way; as, for example, by screws or bolts 33. Apparatus 1 further includes an upper canister means 35 and a lower canister means 37, both of which will be described in more detail hereinafter, and upper hearth plate 21 and lower hearth plate 23 each respectively define a portion of those respective canister means. The overall dimensions of the tunnel and hence, the oven, are such that food product such as pizzas easily fit into the oven and can be completely baked during transit through the oven.

The upper and lower canister means referred to above constitute longitudinal heating ducts and are used to direct heat along the non-oven side of the respective hearth plate; this heat, in turn, being the heat radiated by the hearth plates onto the food product. As shown in FIG. 12, the combustion means 15 of the apparatus includes a gas line 39 connected to an inlet pipe 41. The combustion means includes an upper gas burner 43 and a lower gas burner 45; each burner being supplied gas by the gas pipe. An electronic ignition (not shown) is used to combust gasses supplied to the burners which are conventional power burners. Each burner has a nozzle 47 and 49 respectively, through which the heat generated by the combustion is directed.

A heat exchange means 51 includes an upper transverse heat exchanger 53 and a lower transverse heat exchanger 55. As shown in FIG. 14, each heat exchanger which is, for example, made of a rectangular block of silicate or similar heat absorbent material, has an input end 57, a heat transference passage 59 and first and second output sections 61 and 63 respectively. Each output section has a series of outlets; three, for example, being shown for each section, said outlets being indicated by 61A, 61B and 61C, 63A, 63B and 63C respectively. The area of each outlet gets progressively larger the further the outlet is away from the heat exchanger inlet. This increase in size is provided to facilitate a uniform gradient of heat from the heat exchanger into the respective canister throughout the length of the heat exchanger. The temperature at the outlet from the heat exchangers is approximately 2000° F. (1093° C.) and this heat is directed longitudinally down the respective upper and lower canister. In some instances it may be sufficient to make the openings 61 of the same diameter as each other and to make the openings 63 of the same diameter as each other but of a diameter larger than openings 63. In the embodiment shown each heat exchanger block is disposed within a horizontal transverse housing 58 which is attached to the adjacent hearth plate and provides support for said block.

Importantly, the heat exchangers 51 and 53, in effect, serve as a "heat sink" and buffer the intense temperatures of the products of combustion prior to entry into the canisters 35. The heat exchangers act to absorb the heat from the hot gases which cannot be passed directly into the alloy steel canisters of the type used without causing serious structural warpage. Thus, the heat exchangers serve the dual purpose of distributing and cooling the hot combusted gases.

As will be readily understood, the material from which heat exchangers are formed can withstand extremely high temperatures. In the preferred embodiment the raw material used is colloidal silicate. The heat exchangers are vacuum formed by removing the water by suction leaving a solid residue in the form of a heat exchanger.

Figures 15, 16, 17:
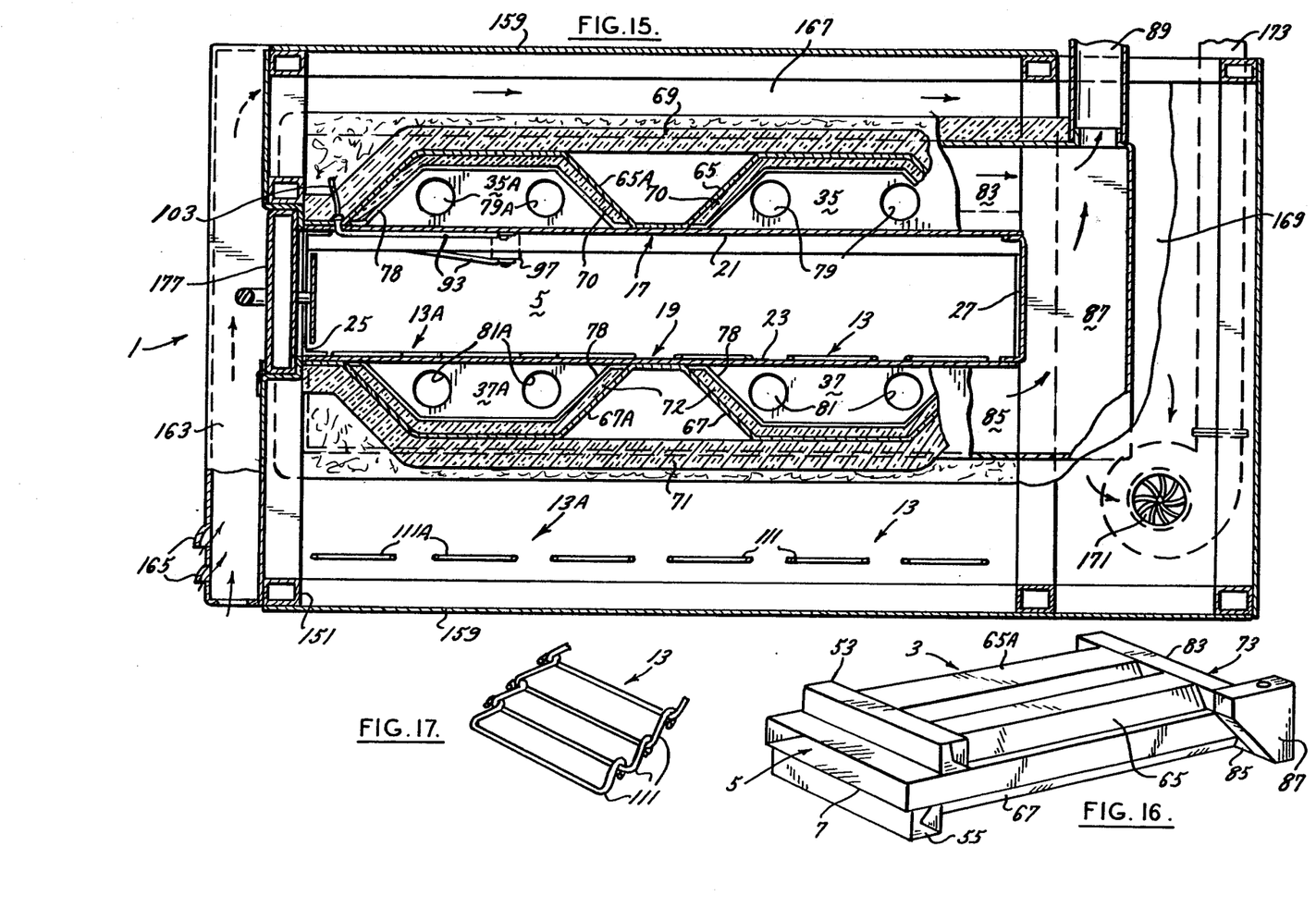
FIG. 15 is a sectional view taken along line 15—15 in FIG. 8B and illustrating both the oven at an intermediate part of the tunnel and the mechanism for circulating room or ambient air over the outside of the oven longitudinal heating chambers.
FIG. 16 is a simplified perspective view of the heated air distribution system.
FIG. 17 is a perspective view of a portion of the link conveyor for moving food product through the oven.

As best shown in FIGS. 12 and 15, canisters 35 and 37 have one side formed by the respective upper and lower hearth plates 21 and 23. The side walls and opposite wall of each canister are formed by a trough member 65 and 67 respectively. These troughs, which extend the length of the canister, are generally U-shaped with angled sides and a flattened base. An outer layer of insulation 69 is placed over the outside of the respective heat exchanger 53 and 55 at the one end of the canister as shown in FIG. 8A and further are fitted over the outlet ends 73 and 75, respectively, of the upper and lower canisters as shown in FIG. 8B. Straps or hangers 77 are used at various points along the length of the oven to hold the insulation in place around the troughs. An inner layer of insulation 70 is placed on the inside of the upper trough and a similar layer 72 is placed on the inside of the lower trough. Straps 78 are likewise used at various points to hold this insulation in place.

As shown in FIGS. 8B and 15 outlet end 73 of the upper canister has a pair of outlets 79 formed therein and the outlet end 75 of the lower canister has a pair of outlets 81 similarly formed therein. The heat exiting the canister through these outlets enters respective upper and lower outlet transverse ducts 83 and 85.

The temperature of the heat at this end of the canister is approximately 500° F. (260° C.). Ducts 83 and 85 commonly open into a vertical duct 87 by which the heat is directed to a chimney 89.

Referring to FIG. 16, the simplified structural configuration shown indicates that oven 5 is defined by tunnel 3. Trough 65, which partially defines heating canister 35 runs longitudinally atop the tunnel, while trough 67, which partially defines heating canister 37 runs longitudinally beneath it. In the embodiment shown both troughs are formed from sixteen (16) gauge aluminized steel. Heat exchanger 53 is mounted transversely of the tunnel, at its inlet end, and is located above the tunnel to supply heat to the upper canister. In like manner, heat exchanger 55 is oriented transversely of the tunnel and situated beneath it to supply heat to the lower canister. Horizontal transverse ducts 83 and 85 attached to adjacent hearth plates are positioned at the outlet end of the tunnel and respectively act as discharge outlets for the upper and lower canisters. The vertical duct 87 conducts the heat discharged from the canister to a chimney. The burners 43 and 45 are power burners and provide forced air pressure to assist combustion, facilitate the flow of hot gases through the system and the purging of the system.

The foregoing describes the heating arrangement by which heat is generated and directed over the backside of the hearth plates 21 and 23 which in the embodiment shown is of ten (10) gauge hot rolled steel. This heat is conducted through the plates and radiates from the oven side of the plates toward food product being conveyed through the oven to bake the food.

Referring to FIGS. 8A, 8B, 10 and 11, a sensing means 91 includes an upper thermocouple temperature sensor 93 and a lower thermocouple temperature sensor 95 positioned in oven 5 near the outlet end of tunnel 3. Brackets 97 are suspended from the ceiling of the oven and the temperature sensor 93 is connected to the bracket in spaced relation from the upper hearth plate 21 with a lead wire 99 leading from the sensor to a control electronics (not shown) incorporated in the control panel 101 (see FIG. 4) of the apparatus. Sensor 95 is positioned on the floor of the oven, connected directly at its remote end to the lower hearth plate 23, with a lead wire 103 going to the control electronics. An inverted V-shaped ramp 105 is placed over the lead wire to protect the sensor and lead wire from the movement of conveyor 13. Similar upper sensors 93 are disposed near the inlet end of the tunnel and at least one point between the inlet and outlet ends except that intermediate sensors 95 are connected directly to the upper hearth plate 21 as shown in FIG. 15. Similar lower sensors 95 are disposed near the inlet end and at least one point between the outlet and inlet ends.

All of the lower sensors 95 and the intermediate upper sensors 93 are attached directly to their respective hearth plates 23 and 21. The intermediate upper sensors 93 are spaced slightly below the upper hearth plate 21. By this arrangement the temperature control system is primarily responsive only to the emitted heat of the lower hearth plate, averaged at several points, but is responsive to a combination of radiant heat and emitted heat of the upper hearth plate. In the embodiment shown the amount of heat supplied to the upper and lower hearth plates 23 and 21 respectively is independently controlled through the medium of the temperature sensors 95 and 93 and the associated control electronics.

Figure 4:
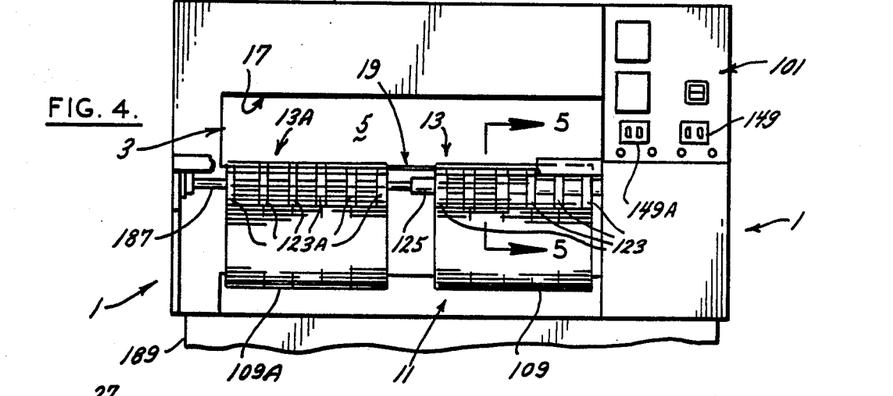
FIG. 4 is a view of an oven taken along line 4—4 in FIG. 3 at the exit end and showing the control panel for the oven.
Figures 5, 6, 7:
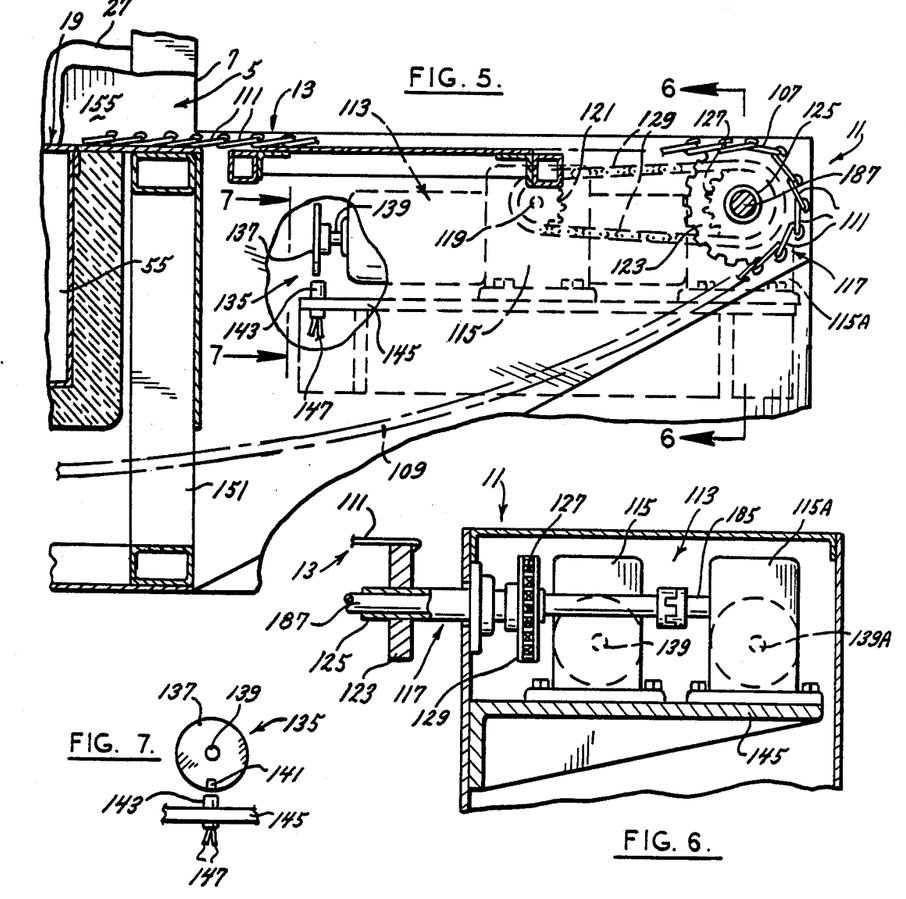
FIG. 5 is an enlarged sectional view taken along line 5—5 of FIG. 4 and illustrating the drive mechanism for the conveyor used to move a food product through the oven.
FIG. 6 is an end view of the drive mechanism taken along line 6—6 in FIG. 5.
FIG. 7 is a side elevational view made along line 7—7 in FIG. 5 and illustrating a speed or rpm sensor for the drive mechanism.

Conveyor 13 has an upper reach 107 and a lower reach 109 and as shown in FIG. 17, the conveyor is comprised of a series of interconnected wire links 111. As best shown in FIGS. 4, 5 and 6 conveying means 11 includes a drive means 113 for moving the conveyor 13. This drive means includes a motor 115 and a drive train 117. The motor has an output or drive shaft 119 to which a sprocket 121 is attached. A series of sprockets 123 (six of which are shown in FIG. 4) fits on a hollow shaft 125 with the teeth of the sprockets engaging links 111 of conveyor 13 to pull the links as the shaft 125 is turned. A sprocket 127, attached to the end of shaft 125 is connected to sprocket 121 by a link belt 129. A second series of sprockets 131 fits on a shaft 133 and the sprocket and shaft are located at the opposite outlet end of tunnel 3 from the remainder of the drive train. The teeth of these second sprockets also engage the links comprising conveyor 13 and turn as the conveyor is driven by motor 115 via the drive train.

Referring to FIG. 7, a motor speed sensing means 135 includes a disk 137 attached to a shaft 139 which turns at the same rate as shaft 119 where motor 115 is operated. The disk includes a magnetized segment 141. A speed or rpm sensor 143 is mounted on a frame member 145 directly beneath the disk and produces an electrical impulse with each passage of segment 141 over the sensor. Wire leads 147 convey the impulse to a control electronics (not shown) located in control panel 101. The control panel has a motor speed section control 149, whose setting is related to the baking time of food product being baked in oven 5.

Figure 3:
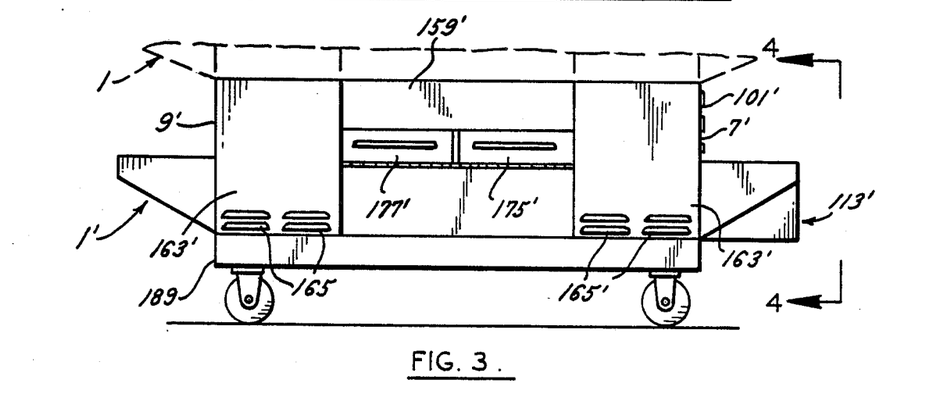
FIG. 3 is a side elevational view of the lower oven unit mounted on the trolley and illustrating doors for inserting or removing food products from the oven.

Overall, the cooking apparatus 1 is constructed above various frame members, certain ones of which are directly referenced. The frame members are sufficiently sturdy to support the structural elements comprising the apparatus. For example, as shown in FIG. 13, a rectangular or box frame member 151 is vertically arranged and forms one corner post at the entrance to the oven. The plate 25, which abuts frame member 151, does, as previously described, form one side wall of oven 5. In addition, plates 153 and 155, which are located at entrance 7 to the oven, are overlapping plates and each also abuts frame member 151. Similar construction is used throughout the apparatus with the various frame members being joined, for example, by welding or by screws or bolts 157 (see FIG. 12). As shown in FIG. 3, a shroud or outer cover 159 fits over the apparatus, this cover being comprised of various metal cover plates joined to the frame members mentioned above.

Figure 1:
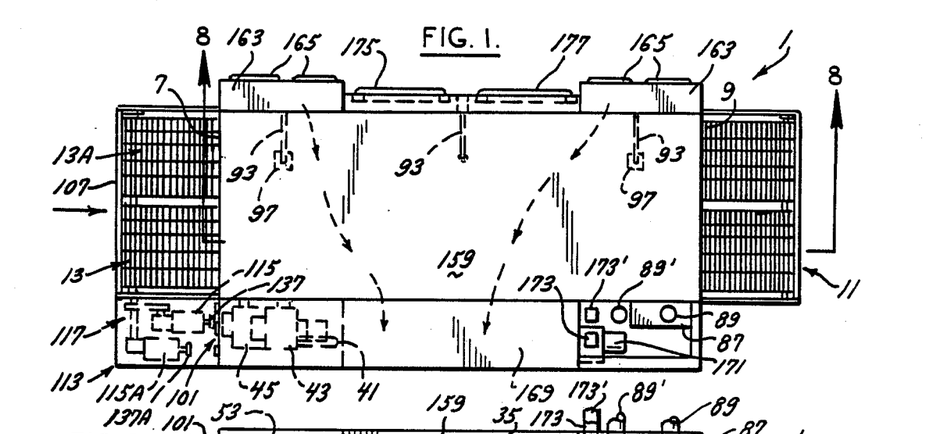
FIG. 1 is a top plan view of an oven of the present invention.

To protect operators using the apparatus, it is desirable that the temperature of the outer cover be close to room temperature. For this purpose, as best shown by reference to FIGS. 1, 3 and 15, the apparatus includes a cooling means 161 for directing room air over the outside of tunnel 3 to maintain the temperature at a safe level. As shown in FIG. 15, means 161 includes an air inlet duct 163 formed on one side of the apparatus at each end of tunnel 3.

Louvers 165 at the base of each inlet duct admit air into the duct. A duct 167 defined by the shroud 159 and the insulation 69 is formed above tunnel 3 and extends the length thereof. A vertical duct 169 is formed on the other side of the tunnel from duct 163. A blower 171 pulls air through duct 163 into duct 167 and thence duct 169; the room air being warmed by heat transmitted from the tunnel. This heat escapes primarily through the side walls of the tunnel, since, as shown in FIG. 15 and as previously described, the insulation 69 and 71 covers only the areas above and below the respective canisters. The warmed air is directed to an air outlet pipe 173 which discharges the air above the apparatus or is connected to an exhaust system (not shown).

Other features of the apparatus not previously described are as follows:

A pair of doors, 175 and 177 respectively, are located intermediate the ends of tunnel 3. The doors which are located approximately midway along the length of the tunnel permit food product to be inserted or removed from the oven if less than a complete passage through the tunnel is required for baking.

Tunnel 3 is constructed so that two conveyors disposed in side-by-side relation can simultaneously convey food product through oven 5. While the construction of this second conveyor 13A has not been previously described, it will be understood that it is the same as conveyor 13. In addition, apparatus 1 has a second set of upper and lower canisters, 35A and 37A, for conducting heat from the heat exchangers to the hearth plates 21 and 23. Again, the construction details are the same as those previously described. Further, the outlets 63A, 63B and 63C of the respective heat exchangers discharge heat into these canisters. The insulation 69 and 71 covers the outside of these canisters as well as canisters 35 and 37 respectively.

Drive means 113, as shown in FIGS. 5 and 6, includes a second motor 115A which is utilized when both conveyors are to be used and permits the conveyors to be driven at selectively different speeds. Motor 115A has a drive shaft 185 which is coupled to a shaft 187 on which a series of sprockets 123A (six of which are shown in FIG. 4) are mounted, said shaft 187 being disposed within hollow shaft 125.

Figure 2:
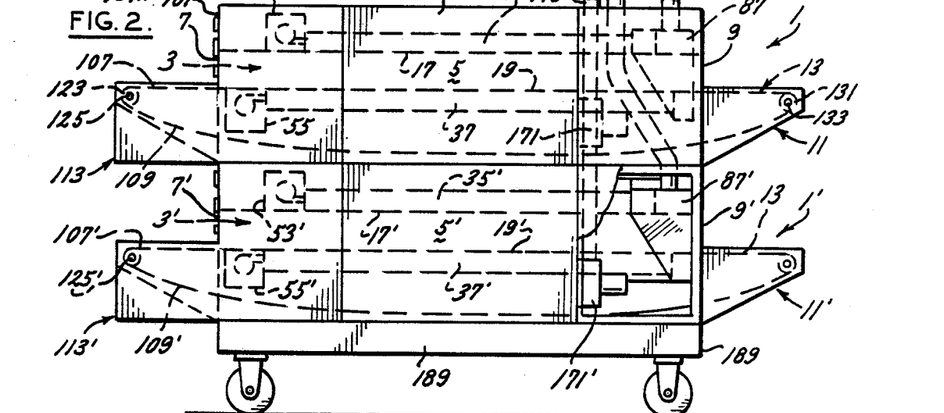
FIG. 2 is a side elevational view illustrating two stacked oven units mounted on a trolley for portability.

As shown in FIG. 2, cooking apparatus 1 is stackable so at least two units of the apparatus 1 and 1' can be used simultaneously. The various elements of apparatus 1 previously described are shown in FIG. 2, for apparatus 1; with the superscript ('). When two units are used the chimney 89' of the lower unit is extended upwardly through the upper unit as shown in FIG. 2.

Lastly, the apparatus, as shown in FIGS. 2 and 3, is portable. A trolley 189 is used to transport either apparatus or both apparatus 1 and apparatus 1'.

Having described the invention in detail, those skilled in the art will appreciate that modifications may be made without departing from its spirit. Therefore, it is not intended that the scope of the invention be limited to the specific embodiments illustrated and described. Rather, it is intended that the scope of this invention be determined by the appended claims and their equivalents.

We claim as our invention:

1. Apparatus for baking food products comprising:
 (a) an elongate tunnel defining an oven, the tunnel having an opening at one end for placing food products into the oven and an opening at the other end for removing baked food products;
 (b) conveyor means for conveying food products from the one end of the tunnel to the other;
 (c) combustion means for combusting gases supplied to the apparatus;
 (d) upper and lower longitudinally extending duct means to which the heat from the combustion of gases is directed, the upper duct means including a lower portion operatively defining an upper tunnel wall and providing an upper hearth means and the lower duct means including an upper portion operatively defining a lower tunnel wall and providing a lower hearth means, the upper and lower hearth means radiating heat imparted thereto downwardly and upwardly respectively, onto the food product as it passes through the tunnel, whereby the food product is baked;
 (e) temperature sensing means for sensing the heat radiated from the upper and lower hearth means and operatively controlling gas combustion;
 (f) a heat exchanger means for distribution of the heat of combustion to the upper and lower heating duct means; and
 (g) exhaust means exhausting gasses from the duct means to ambience.

2. The apparatus of claim 1, wherein:
 (h) the combustion means includes an upper burner and a lower burner, and
 (i) the heat exchanger means includes an upper heat exchanger having an inlet connected to the upper burner and a lower heat exchanger having an inlet connected to the lower burner, said heat exchangers being formed from a block of heat absorbing material.

3. The apparatus of claim 2, wherein:
 (j) each heat exchanger is of silicate material oriented transversely to the respective upper and lower duct means and has a plurality of outlets for conducting heat from its respective burner into the duct means at various points along the length of the respective heat exchanger means.

4. The apparatus of claim 3, wherein:
 (k) the outlets from each heat exchanger into its respective heating duct means increase in area from the outlet nearest the inlet to the heat exchanger to the outlet farthest therefrom whereby the amount of heat conducted into the respective duct means is uniform along the length thereof.

5. The apparatus as set forth in claim 1 further comprising:
 (h) cooling means for directing ambient air over the outside of the tunnel to maintain the temperature on the outside of the apparatus as a desired level, the cooling means including cooling duct means at least partially surrounding the tunnel and hearth means, the cooling duct means having an air inlet through which ambient air is drawn into the duct means and an air outlet through which heated air is emitted, and blower means for pulling air into, through and out of the cooling duct means.

6. The apparatus as set forth in claim 1, wherein:
(h) the heating duct means further includes elongate trough means forming the wall of the respective heating duct means opposite the surface defined by the respective hearth means and extending the length of the heating duct means.

7. The apparatus as set forth in claim 6, further comprising:
(i) the trough means includes a generally U-shaped trough, and
(j) insulation means installed over the inside and outside of each trough and extending substantially the length thereof.

8. The apparatus as set forth in claim 1 further comprising:
(h) temperature sensing means for sensing the temperature at an intermediate point inside the tunnel, said temperature sensing means including a plurality of first temperature sensors positioned inside the tunnel adjacent to the upper hearth means, and a plurality of second temperature sensors positioned inside the tunnel adjacent the lower hearth means, said temperature sensors sensing primarily emitted heat.

9. The apparatus as set forth in claim 8, wherein:
(i) the lower temperature sensors are attached directly to said hearth plate to sense emitted heat.

10. The apparatus as set forth in claim 9 further comprising:
(j) at least one temperature sensor attached directly to the lower hearth means includes a ramp positioned over the sensor, and the conveyor means includes link conveyor traveling over the ramp.

11. The apparatus as set forth in claim 8, wherein:
(i) the upper hearth means includes an upper hearth plate and at least one upper temperature sensor is attached directly to said hearth plate and at least one temperature sensor is spaced from said hearth plate to sense emitted and radiant heat.

12. Apparatus for baking food products comprising:
(a) an elongated tunnel defining an oven, the tunnel having an opening at one end for placing food products into the oven and an opening at the other end for removing baked food products;
(b) conveyor means for conveying food products from the one end of the tunnel to the other;
(c) combustion means for combusting gasses supplied to the apparatus including burner means;
(d) upper and lower longitudinally extending duct means to which the heat from the combustion of gasses is directed, the upper duct means including a lower portion operatively defining an upper tunnel wall and providing an upper hearth means and the lower duct means including an upper portion operatively defining a lower tunnel wall and providing a lower hearth means, the upper and lower hearth means radiating heat imparted thereto downwardly and upwardly respectively, onto the food product as it passes through the tunnel, whereby the food product is baked;
(e) temperature sensing means for sensing the heat radiated from the upper and lower hearth means operatively controlling gas combustion;
(f) heat exchanger means disposed between the duct means and the burner means and including an inlet means connected to the burner means and outlet means connected to the duct means, said heat exchanger means being formed from a block of heat absorbing material; and
(g) exhaust means exhausting gasses from the duct means to ambience.

* * * * *

UNITED STATES PATENT AND TRADEMARK OFFICE
CERTIFICATE OF CORRECTION

PATENT NO. : 4,884,552
DATED : December 5, 1989
INVENTOR(S) : Kelley J. Wells et al It is certified that error appears in the above-identified patent and that said Letters Patent is hereby corrected as shown below:

Column 9, line 26, before "the" insert --the lower hearth means includes a lower hearth plate and--.

Column 10, line 5, delete "elongated" and insert --elongate--.

Column 10, line 27, before "operatively" insert --and--.

Signed and Sealed this

Thirtieth Day of October, 1990

*Attest:*

HARRY F. MANBECK, JR.

*Attesting Officer*   *Commissioner of Patents and Trademarks*